C. T. JOSLIN.
MEASURING FAUCET.
APPLICATION FILED OCT. 20, 1917.

1,342,173.

Patented June 1, 1920.

Inventor.
Charles T Joslin
By Brockett and Hyde
Attys.

UNITED STATES PATENT OFFICE.

CHARLES T. JOSLIN, OF CLEVELAND, OHIO, ASSIGNOR TO THE RUSS COMPANY, OF CLEVELAND, OHIO, A CORPORATION OF OHIO.

MEASURING-FAUCET.

1,342,173.   Specification of Letters Patent.   Patented June 1, 1920.

Application filed October 20, 1917. Serial No. 197,586.

*To all whom it may concern:*

Be it known that I, CHARLES T. JOSLIN, citizen of the United States, residing at Cleveland, in the county of Cuyahoga and State of Ohio, have invented certain new and useful Improvements in Measuring-Faucets, of which the following is a specification.

This invention relates to faucets for measuring liquids, such as syrups, flavorings or the like.

The object of the invention is to provide an improved faucet of simple and compact form which can be attached to any reservoir; which is easily manipulated; which at each operation causes or allows the discharge from the reservoir of a definite measured quantity of liquid; and which faucet can be made at low cost and is not likely to get out of order in service.

Further objects of the invention are in part obvious and in part will appear more in detail hereinafter.

The invention comprises the measuring faucet hereinafter described and claimed.

Figure 1:
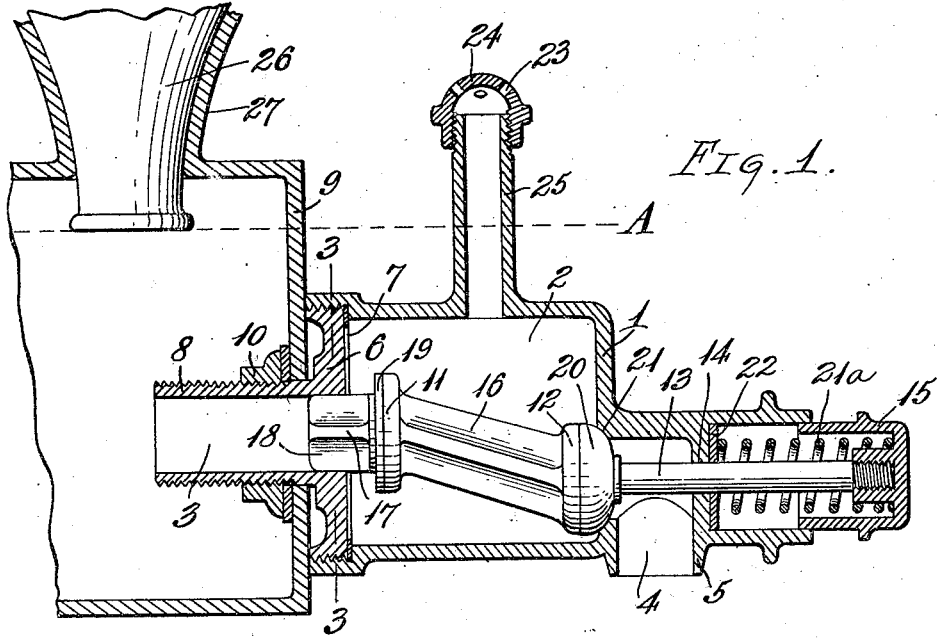
Figure 2:
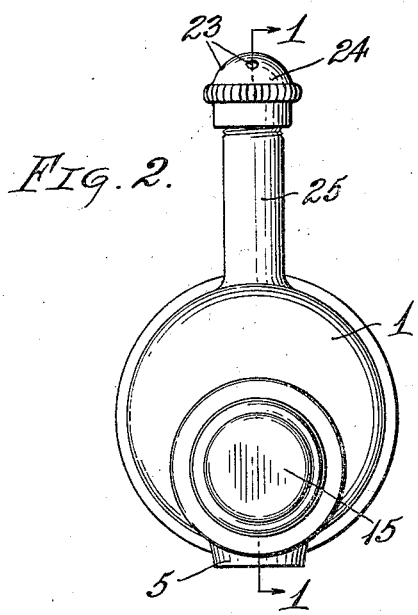
Figure 3:
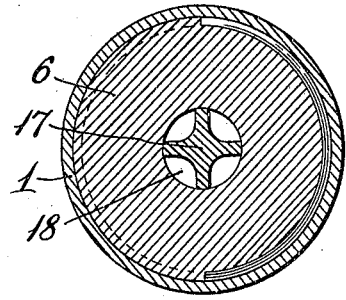

In the drawings Figure 1 represents a longitudinal sectional elevation on the line 1—1 Fig. 2, showing the faucet connected to a reservoir, the parts being in closed position; Fig. 2 is an end view thereof; and Fig. 3 is a cross section on the line 3—3 Fig. 1.

The faucet shown in the drawings comprises a suitable outer casing 1 having a hollow body portion in which is a measuring chamber 2 for the liquid to be discharged. This body portion can be made of any suitable size so that each operation of the device will discharge the desired quantity of liquid. Said casing is provided at one end with an inlet passage 3 and at its opposite end with an outlet passage 4, the latter terminating in a downwardly extending nozzle or mouth 5 from which the liquid is discharged into any receiver, such as a cup or the like. The inlet passage 3 is the longitudinal bore in a closure 6 threaded into the rear end of the casing against a gasket or packing leather 7, said closure having a central threaded stem portion 8 which may be passed through an opening in the wall of a suitable receptacle 9 to which it is firmly attached by the nut 10.

The flow of liquid from the receptacle 9 to the outlet or mouth 5 is controlled by a valve device preferably of a form capable of simultaneously controlling both the inlet and outlet passages for the measuring chamber. As illustrated, said device comprises an inlet valve member 11 and an outlet valve member 12 carried by and movable with a stem 13. Said stem passes through an opening 14 in the front wall of the outlet passage 4 to the outside of the faucet, where it is provided with a hollow cap 15 threaded upon the end of said valve stem. The inner end of the valve stem carries a valve support 16 on which the valve members 11 and 12 are mounted. This support includes a member 17 having sliding movement in the inlet passage 3 and provided with one or several longitudinal channels 18 in its side walls, at the inner end of which is located a washer or gasket 19 of suitable packing material, such as leather, composition material or the like. This packing member coöperates with the flat inner face of the closure 6 as a valve seat. The outer end of the support 16 carries a round packing member 20 of similar packing material and coöperating with a valve seat 21 at the inner end of the passage 4. Surrounding the valve stem 13 and lying between walls 14 and head 15 is a compression spring 21ª, which normally holds the valve parts in the position shown in Fig. 1 and also serves to hold to its seat the packing 22 surrounding the stem and preventing escape of material other than by way of outlet 5.

When the parts are in the position shown in Fig. 1 liquid in the reservoir 9 flows to and through the passage 3 and longitudinal channels 18 into the measuring chamber 2. Flow of liquid into said chamber is permitted by a suitable relief or vent for the air therein, this relief, in the form shown, comprising one or a series of small ports 23 in a cap 24 secured to the upper end of the hollow body portion of the casing. The level of liquid in the reservoir 9 cannot be permitted to rise above the relief ports 23 which would allow loss of liquid through said ports. Consequently if the reservoir 9 is a large tank or vessel the hollow tube 25 must rise to a sufficient height so that the vent ports in its cap are above the top of said reservoir. Said tube, in said case, should also be of small diameter so that variations in the level to which the liquid rises in said tube will not materially affect the quantity discharged at each operation. Preferably the reservoir 9 is an intermediate reservoir in which a constant level of liquid is maintained only a short distance above the body portion of the casing 1, so that the tube 25 can be short as illustrated. With this arrangement the main body of liquid is contained in a suitable vessel, such as the bottle 26, supported by a hopper or inverted cone 27 in the receptacle 9, and with its mouth inverted. This arrangement produces a liquid seal at the mouth of the bottle and at the level marked A. Consequently no liquid can rise in the tube 25 above this level.

With the parts in the position shown in Fig. 1 the measuring chamber is full to the level A and flow through the outlet passage 4 is cut off by the valve member 12. By pressing in on the cap 15 valve 12 is moved away from its seat while valve 11 seats upon the face of closure 6, thereby cutting off the supply of liquid from the intermediate reservoir 9 to the chamber 2 and allowing discharge through the mouth 5 of the measured quantity of material in said chamber. When the pressure of the finger is released from the cap 15 the parts return to the position shown in Fig. 1 and the measuring chamber is again filled by gravity ready for another operation of the device.

What I claim is:—

1. A measuring faucet, comprising a hollow casing provided at one side with a hollow shank for attachment to the side wall of a reservoir, a valve seat at the inner end of said shank, said casing having a discharge passage and valve seat at a lower level than said shank and out of the axis thereof, and a valve body movable within said hollow casing and having valve members coöperating with said seats.

2. A measuring faucet, comprising a hollow casing adapted for connection to the side wall of a reservoir, one wall of said casing having an inlet passage providing communication to said reservoir, the opposite wall of said casing being provided with a discharge passage at a lower level than said inlet passage, valve seats within said casing at said passages, and a valve body having valve portions coöperating with said seats, said body being movable back and forth along a line at an angle to a line connecting said passages.

3. A measuring faucet, comprising a hollow casing adapted for connection to the side wall of a reservoir, one wall of said casing having an inlet passage providing communication to said reservoir, the opposite wall of said casing being provided with a discharge passage at a lower level than said inlet passage, valve seats within said casing at said passages, a valve body having valve portions coöperating with said seats, and a valve operating stem slidable in said casing and extending diagonally to a line connecting said passages.

In testimony whereof I affix my signature.

CHARLES T. JOSLIN.